United States Patent [19]

Furlong

[11] 4,132,264
[45] Jan. 2, 1979

[54] PLASTIC HEAT EXCHANGE TUBE

[75] Inventor: Donn B. Furlong, San Rafael, Calif.

[73] Assignee: Ecodyne Corporation, Lincolnshire, Ill.

[21] Appl. No.: 757,194

[22] Filed: Jan. 6, 1977

Related U.S. Application Data

[63] Continuation-in-part of Ser. No. 534,592, Dec. 20, 1974, abandoned.

[51] Int. Cl.² ............................................. F28F 1/06
[52] U.S. Cl. .................................... 165/179; 138/38; 138/173; 165/184
[58] Field of Search ..................... 138/122, 173, 38; 165/179, 172, 184

[56] References Cited

U.S. PATENT DOCUMENTS

| | | | |
|---|---|---|---|
| 1,983,468 | 12/1934 | Knab | 138/122 X |
| 2,085,563 | 6/1937 | Aime | 138/122 |
| 2,115,769 | 5/1938 | Harris | 165/179 |
| 2,492,932 | 12/1949 | Fausek et al. | 165/179 |
| 2,929,408 | 3/1960 | Weatherwax et al. | 138/38 |
| 3,014,501 | 12/1961 | Jacobi | 138/122 |
| 3,122,171 | 2/1964 | Britton et al. | 138/122 |
| 3,217,799 | 11/1965 | Rodgers | 165/179 |
| 3,612,175 | 10/1971 | Ford et al. | 138/38 |
| 3,636,982 | 1/1972 | Drake | 138/38 |
| 3,693,713 | 9/1972 | Stahl | 165/184 |

FOREIGN PATENT DOCUMENTS 2156578  5/1973  Fed. Rep. of Germany ........... 138/122

Primary Examiner—Charles J. Myhre
Assistant Examiner—Sheldon Richter
Attorney, Agent, or Firm—Richard G. Lione

[57] ABSTRACT

A plastic heat exchange tube for use in combination with large dry and wet/dry type cooling towers. The tube includes a tubular center portion around which an open ended channel portion spirals over substantially the entire length thereof, with the open end in communication with the interior of the center portion. The optimum channel portion height to pitch ratio is 1.5 to 1. A web portion extends through the center portion of the tube.

3 Claims, 5 Drawing Figures

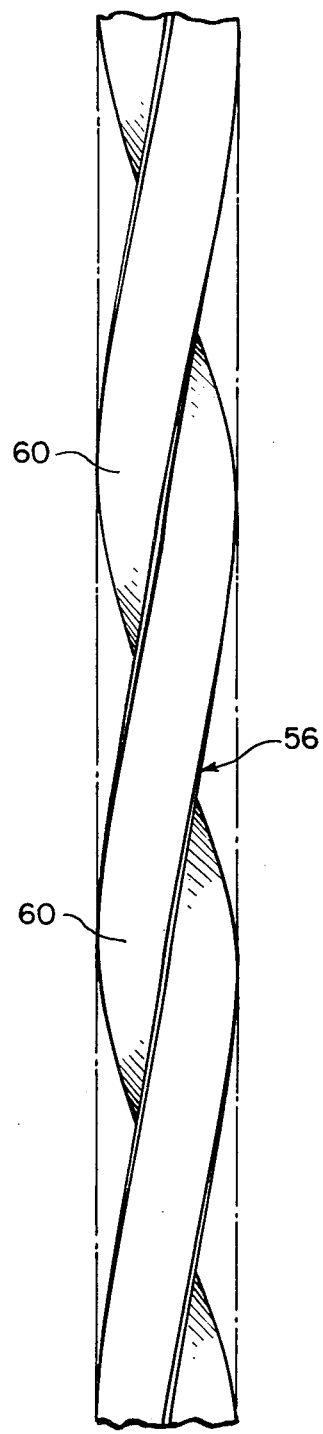
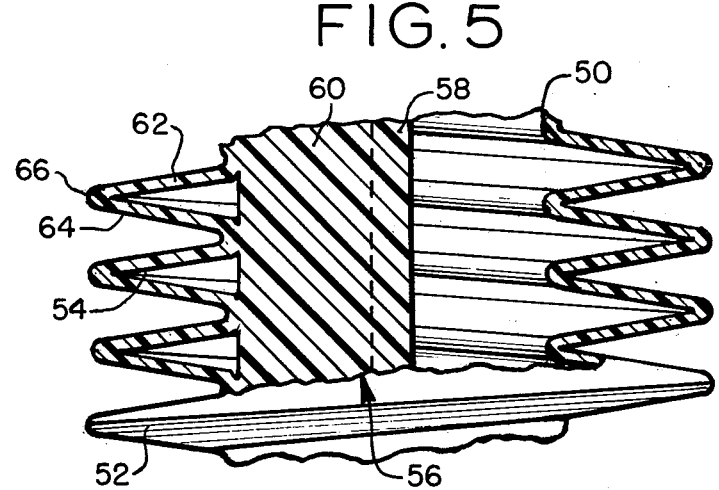

PLASTIC HEAT EXCHANGE TUBE

BACKGROUND AND SUMMARY OF THE INVENTION

This is a continuation-in-part of pending application Ser. No. 534,592 now abandoned, filed Dec. 20, 1974, for PLASTIC HEAT EXCHANGE TUBE.

The present invention relates to a unique plastic heat exchange tube particularly designed for use in combination with large dry and wet/dry type cooling towers.

There is a general trend today towards fry and wet/dry cooling due to public opinion factors against wet cooling in the areas of drift and blowdown discharges, as well as availability of makeup and blowdown water. However, despite their environmental advantages, dry and wet/dry cooling towers have not found generalized employment because of their relatively high initial cost and the likelihood of the metallic finned heat exchange tubes heretofore used therein corroding by chemical action with atmospheric agents.

The present invention is directed to a unique plastic heat exchange tube which may be readily substituted for the heretofore used metallic finned heat exchange tubes. The use of such tubes will significantly reduce the initial cost of the recipient dry and wet/dry towers to the extent that they become competitively priced with conventional wet cooling towers and do not present the corrosion problem which exists in current dry and wet/dry towers.

Despite the known low thermal conductivity of plastics, which range in the order of from 0.2% to 10% of the metals commonly used in heat exchange tube construction, tubing composed of organic polymers have been used efficiently in heat exchange devices between fluid masses. The heretofore used plastic heat exchange tubes have been made from thermoplastics or other known types of organic polymers and have taken the form of hollow filaments of very minute diameter having very thin and substantially smooth wall surfaces. Such tubes are of substantially smaller size than the metallic heat exchange tubes commonly used in large dry and wet/dry heat exchangers and consequently not readily substituted therefore.

Accordingly, it is a primary object of the present invention to provide a heat exchange tube for use in dry and wet/dry cooling applications which is considerably less expensive to manufacture than heretofore used metallic finned heat exchange tubes.

Another object is to provide a heat exchange tube for use in dry and wet/dry cooling applications which is non-corrosive when subjected to the generally encountered environmental agents.

A further object of the present invention is to provide a plastic heat exchange tube which has increased heat transfer characteristics over heretofore proposed plastic heat exchange tubes.

A still further object is to provide a plastic heat exchange tube having heat transfer characteristics and structural stability which permits its substitution for metallic heat exchange tubes currently being used in large dry and wet/dry cooling towers.

These and other objects are realized in accordance with a preferred embodiment of the present invention by providing an integrally formed plastic heat exchange tube having a tubular center portion around which an open ended channel portion spirals over substantially the entire length thereof, with the open end in communication with the interior of the center portion. The channel portion serves the dual function of materially increasing the heat transfer surface area of the tube and causing a turbulating mechanism which prevents laminar flow of liquid through the tube. The ratio of channel portion height (distance which it extends outwardly of the tubular center portion) to pitch (distance longitudinally of the tubular center portion between corresponding points on adjacent channel portion sections) is preferably 1.5 to 1. Although not so advantageous, the invention contemplates that the height to pitch ratio might go as low as 1 to 1 or as high as 2 to 1.

A web portion extends through the center portion of the tube for imparting longitudinal stability to the tube. In its preferred form the web portion includes a plurality of ribs which extend radially outward from the center axis of the tube toward the channel portion and spiral as they extend longitudinally through the center portion of the tube in the direction of the channel portion spiral. The web portion imparts a turbulating effect to the liquid passing through the tube to further prevent laminar flow and subsequently increase the heat transfer characteristics of the tube.

BRIEF DESCRIPTION OF THE DRAWINGS

Other objects and many of the attendant advantages of the present invention will be readily appreciated as the invention becomes better understood by reference to the following detailed description, when considered in connection with the accompanying drawings, in which like reference numerals designate like parts throughout the figures thereof and wherein:

FIG. 4 is an elevational view of the web portion of the plastic heat exchange tube shown in FIG. 2; and FIG. 5 is a sectional view taken along line 5—5 in FIG. 3.

DESCRIPTION OF THE PREFERRED EMBODIMENTS

Figure 1:
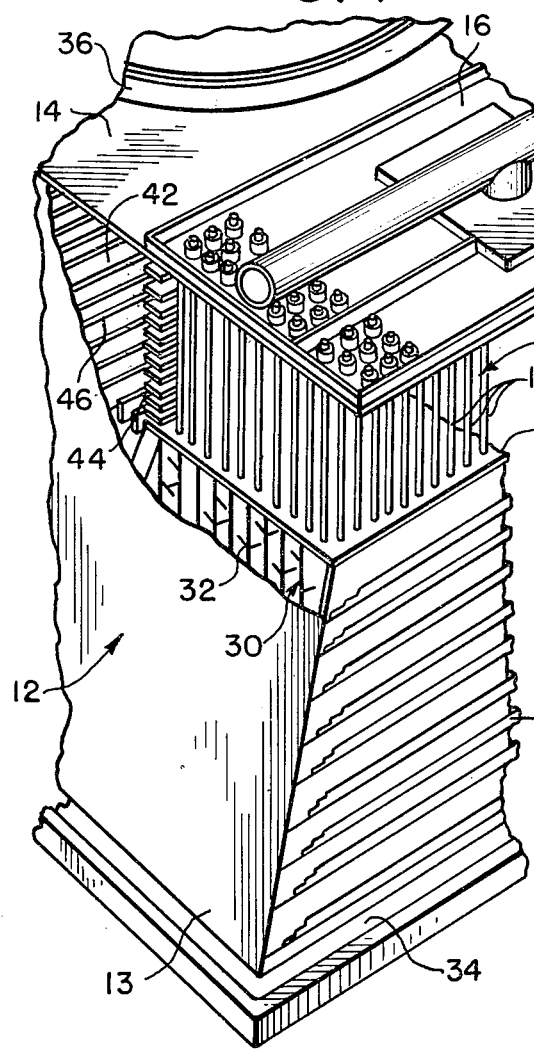
FIG. 1 is a perspective view of a portion of an exemplary wet/dry cooling tower of a type contemplated for use with the plastic heat exchange tubes of the present invention.
Figure 2:
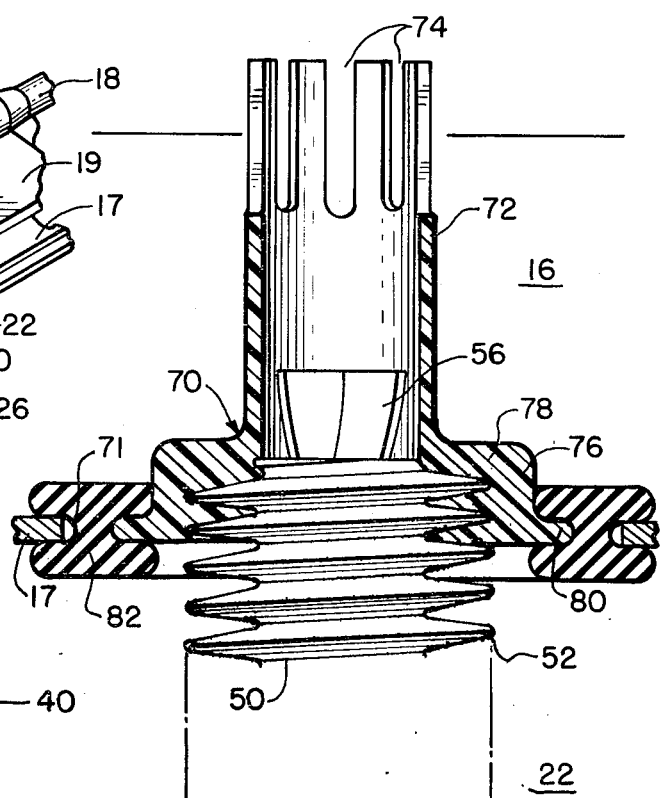
FIG. 2 is an elevational view of the plastic heat exchange tube of the present invention illustrated in combination with a unique mounting arrangement for mounting the tube in a cooling tower of the type shown in FIG. 1.

Referring to FIGS. 1 and 2, a plastic heat exchange tube 10, constructed in accordance with the present invention, is shown in combination with a wet/dry cooling tower 12 for purposes of giving an exemplary environmental context to the invention. It should be understood, however, that the heat exchange tubes of the present invention are intended for use in other types of well-known wet/dry and dry cooling arrangements, both of the mechanical draft and natural draft class.

Referring to FIG. 1, a portion of an exemplary wet/dry cooling tower is indicated generally at 12. Tower 12 includes a housing 13 incorporating a top deck 14 defining a hot water distribution basin 16. Liquid, such as water to be cooled, is pumped into basin 16 through distribution pipe 18 and distribution box 19. Positioned immediately below basin 16 is a dry cooling section 22 which includes a plurality of vertically disposed plastic heat exchange tubes 10 constructed in accordance with the present invention. Tubes 10 are arranged in a plurality of transversely extending rows and mounted between a floor 17 of basin 16 and a horizontal partition deck 26. Liquid from basin 16 flows downward through tubes 10 for distribution over a wet cooling section 30 positioned immediately therebelow. After descending through fill or packing 32, supported within wet section 30, the cooled liquid is collected in a cold water collection basin 34 for removal to service.

Ambient cooling air is drawn laterally through the tower by a fan (not shown) rotating in fan stack 36. The air passes successively through openings between inlet louvers 40, which are separately associated with both dry section 22 and wet section 30, and then through the respective dry and wet sections 22 and 30. The exhaust air from dry section 22 and wet section 30 are mixed in plenum area 42 prior to discharge from the tower via stack 36 to the atmosphere. Movable louver assemblies 44 and 46 may be provided to permit control of the ratio of air mix in the pelnum area 42 which emanates from the dry and wet sections.

A plastic heat exchange tube 10 formed in accordance with the present invention is illustrated in FIGS. 2-5. Tube 10 includes a tubular center portion 50 around which an open ended channel portion 52 spirals over substantially the entire length thereof. As previously pointed out, the center portion 50 and channel portion 52 are integrally formed. The result is, as FIG. 5 clearly shows, there are no seams extending spirally along the tube. Channel portion 52 includes an open end 54 which is in fluid communication with the interior of center portion 50 such that liquid passing through the center portion 50 is free to enter and exit channel portion 52 over substantially the entire length thereof.

Figure 3:
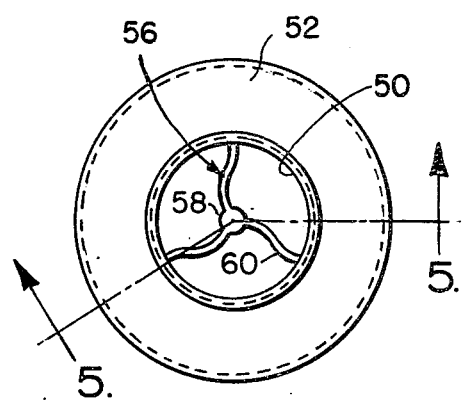
FIG. 3 is a plan view of the plastic heat exchange tube shown in FIG. 2.

A web portion 56 extends through the center portion 50. Web portion 56 includes a center core section 58, extending through the longitudinal center axis of the tube 10, from which three rib sections 60 extend radially outward toward and into engagement with the inner surface of center portion 50. As best seen in FIGS. 3 and 4, the rib sections 60 spiral in the same direction as the channel portion 52 as they extend longitudinally through the center portion 50.

A preferred form of heat exchange tube constructed in accordance with the present invention has a center portion 50 with an outside diameter of 1" and a channel portion 52 with an outer diameter of 1.75". The channel portion 52 is defined by side walls 62 and 64 and a curved end wall 66, as seen in FIG. 5. The nominal thickness of walls 62, 64, and 66 is 0.03 inches. The side walls 62 and 64 taper towards one another as they extend outward from center portion 50.

The height of each channel portion 52 is thus seen to be ⅜". According to the preferred form of the invention, the pitch of the channel portion spiral is ¼". The height to pitch ratio is thus 1.5 to 1. For reasons hereinafter discussed, this configuration is the most advantageous, considering all pertinent factors. According to the invention the height to pitch ratio can be varied within limits, however, and still retain substantial, although lesser, advantages.

The rib sections 60 are 0.03 inches in thickness and make a complete spiral over each foot of tube length. They are three in number, as will be noted, and spiral in the same direction as the channel portion 52.

Referring to FIG. 2, a unique manner of supporting the tubes 10 between floor 17 and a partition deck 26 is shown. A top socket and nozzle member 70 is provided to extend through a cooperating opening 71 in floor 17 and perform the dual function of directing the liquid to be cooled from basin 16 into tube 10 and supporting the tube 10 from floor 17. Top socket 70 includes an upstanding hollow neck portion 72 having slotted openings 74 formed about the upper portion thereof to receive the liquid from basin 16 therethrough and direct it into the tube 10. Socket 70 additionally includes a base portion 76 having a spiral cavity 78 formed therein for receipt of the upper section of the channel portion 52 therein. The socket 70 is preferably formed from a plastic material and split vertically into two parts which may be bonded together after the channel portion 52 is properly seated in the cavity 78. An annular flange 80 is formed about the base portion 76 for securing socket 70 to floor 17 via a rubber grommet 82 wedged therebetween. A lower socket 84 is provided for securing the lower end of tube 10 to the partition deck 26. Lower socket 84 is formed from a plastic material with an upper cavity 86 for receipt of the center portion 50 and the web portion 56 therein and a lower cavity 88 for receipt of a conventional spray nozzle assembly 90 therein. Upper and lower flanges 92 and 94 are provided for sandwiching partition deck 26 therebetween as socket 84 is forced through a cooperating opening 96 in the deck 26.

In operation, liquid to be cooled passes from the basin 16 through slots 74 in socket 70 and down into the heat exchange tubes 10. As the liquid enters each tube 10, the bulk of it initially seeks to descend in the center portion 50 while a portion of it initially finds its way into the channel portion 52 and seeks to descend spirally therein. Because of the low pitch, and relatively high height to pitch ratio, however, the liquid which initially enters the channel portion 52 tends to turbulently tumble in and out of the channel portion while continuing spiral movement. At the same time the liquid which initially starts down the center portion 50 is turbulently rotated outwardly into the channel portion 52 by the spiral, three rib 60 web portion 56 spiralling in the same direction but at a pitch of approximately 1 foot. Subsequently, it too tumbles into and out of the channel portion 52 while continuing spiral movement.

The combination of channel portion 52 depth (i.e., height), low pitch spiral configuration, a height to pitch ratio of approximately 1.5 to 1, and three rib web portion 56 produces substantially non-laminar liquid flow while maintaining a high incidence of fluid contact with the tube 10 wall. The ambient air drawn through the dry section 22 cools the liquid passing through the tubes 10. The cooled liquid leaving tube 10 is directed through nozzle 90 and sprayed over the wet section 30. The ambient air drawn through the wet section 30 further cools the liquid as it descends therethrough for collection in basin 34.

It should be understood, of course, that the foregoing disclosure relates to only a preferred embodiment of the invention and that numerous modifications or alterations may be made therein without departing from the true spirit and the scope of the invention as set forth in the appended claims.

What is claimed is:

1. In a heat exchanger, the improvement in a heat exchange tube, comprising:

a. an elongated center portion for receiving liquid flow therethrough from an inlet end of the tube to an outlet end, b. an open-ended channel portion spiralling in one direction about said center portion along substantially the entire length thereof with the open end of said channel portion in fluid communication with the interior of said center portion,
c. said center and channel portions being integrally formed from plastic so as to be seamlessly joined to each other along said length,
d. the height of said channel portion being a least as great as the pitch of the spiral and no greater than two times the pitch, and
e. a web portion extending through said center portion so as to impart longitudinal stability to the tube and to turbulently rotate liquid flowing through the tube outwardly into said channel portion,
f. said web portion having at least two substantially radially extending legs,
g. said radially extending legs spiraling about the axis of said center portion along substantially the entire length of said center portion.

2. The improvement in the heat exchange tube of claim 1 further characterized in that:
a. the height of said channel portion is approximately one and one-half times the pitch of the spiral of said channel portion.

3. The improvement in the heat exchange tube of claim 1 further characterized in that:
a. said radially extending legs spiral about the axis of said center portion in said one direction (along substantially the entire length of said center portion) whereby they rotate liquid flowing through the tube in said one directon,
b. the pitch of said ribs as they spiral along the length of said center portion being no greater than one foot.

* * * * *